US012669098B2

(12) United States Patent

Kiwan et al.

(10) Patent No.: US 12,669,098 B2

(45) Date of Patent: Jun. 30, 2026

(54) FEEDBACK FUEL CONTROL FOR DUAL PATH EXHAUST SYSTEM

(71) Applicant: Ford Global Technologies, LLC, Dearborn, MI (US)

(72) Inventors: Rani Kiwan, West Bloomfield, MI (US); Michiel J. Van Nieuwstadt, Ann Arbor, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 18/789,171

(22) Filed: Jul. 30, 2024

(65) Prior Publication Data

US 2026/0036098 A1 Feb. 5, 2026

(51) Int. Cl.

*F02D 41/40* (2006.01)
*F02D 41/14* (2006.01)
*F02D 41/38* (2006.01)

(52) U.S. Cl.

CPC ......... *F02D 41/40* (2013.01); *F02D 41/1441* (2013.01); *F02D 41/1445* (2013.01); *F02D 41/1446* (2013.01); *F02D 41/1454* (2013.01); *F02D 2041/389* (2013.01)

(58) Field of Classification Search

CPC .. F02D 41/40; F02D 41/1441; F02D 41/1445; F02D 41/1446; F02D 41/1454; F02D 2041/389

See application file for complete search history.

(56) References Cited

U.S. PATENT DOCUMENTS

| | | | | |
|---|---|---|---|---|
| 9,683,505 | B2 | 6/2017 | Santillo et al. | |
| 10,267,202 | B2 * | 4/2019 | Magner | F02D 41/1441 |
| 10,947,910 | B2 | 3/2021 | Magner et al. | |
| 11,499,471 | B2 | 11/2022 | Zhang et al. | |
| 2004/0098970 | A1 | 5/2004 | Foster | |
| 2007/0125069 | A1 * | 6/2007 | Storhok | F01N 11/00 60/284 |
| 2007/0125070 | A1 * | 6/2007 | Storhok | F01N 3/0842 60/284 |
| 2010/0242569 | A1 * | 9/2010 | Kerns | F02D 41/1454 60/276 |
| 2012/0080016 | A1 * | 4/2012 | Bagnasco | F02D 41/1454 123/673 |
| 2013/0060449 | A1 * | 3/2013 | Bagnasco | F02D 41/1454 701/103 |
| 2013/0186065 | A1 * | 7/2013 | Jeffrey | F02D 41/1441 60/285 |

(Continued)

FOREIGN PATENT DOCUMENTS

DE 102020112266 A1 11/2020

OTHER PUBLICATIONS

Kiwan, R. et al., "Exhaust System Valve Diagnostics," U.S. Appl. No. 18/781,461, filed Jul. 23, 2024, 38 pages.

*Primary Examiner* — Joseph J Dallo

(74) *Attorney, Agent, or Firm* — McCoy Russell LLP

(57) ABSTRACT

Systems and methods for controlling fuel that is supplied to cylinders of an internal combustion engine are described. In one example, the fuel is controlled in response to output of two different outer-loop fuel controllers. The fuel may be controlled according to the individual separate outputs of outer-loop controllers or the combined outputs of the two different fuel controllers.

20 Claims, 5 Drawing Sheets

(56) References Cited

U.S. PATENT DOCUMENTS

| | | | | |
|---|---|---|---|---|
| 2014/0130785 | A1* | 5/2014 | Levijoki | F02D 41/1495 123/703 |
| 2015/0081160 | A1* | 3/2015 | Jecks | F02D 41/00 701/31.1 |
| 2016/0018291 | A1* | 1/2016 | Uhrich | F01N 11/007 73/114.69 |
| 2016/0047328 | A1* | 2/2016 | Buslepp | F02D 41/0085 701/104 |
| 2017/0002755 | A1* | 1/2017 | Majors | F02D 41/08 |
| 2017/0089280 | A1* | 3/2017 | Santillo | F02D 41/2461 |
| 2017/0356362 | A1* | 12/2017 | Macewen | F02D 41/009 |
| 2018/0171867 | A1 | 6/2018 | Ulrey et al. | |
| 2019/0071172 | A1* | 3/2019 | Caldwell | B64U 50/20 |
| 2020/0284182 | A1* | 9/2020 | Santillo | F01N 11/007 |
| 2020/0355130 | A1* | 11/2020 | Magner | F02D 41/1454 |
| 2021/0033008 | A1 | 2/2021 | Naclerio | |

* cited by examiner

FEEDBACK FUEL CONTROL FOR DUAL PATH EXHAUST SYSTEM

FIELD

The present description relates to a system and methods for controlling fuel that is supplied to engine cylinders. The methods and systems adjust fuel controller operation according to different paths that exhaust travels in an exhaust system.

BACKGROUND AND SUMMARY

A V8 engine includes a first cylinder bank and a second cylinder bank. The first cylinder bank may be coupled to a first exhaust passage that includes a first catalyst. Similarly, the second cylinder bank may be coupled to a second exhaust passage that includes a second catalyst. The first exhaust passage may include two oxygen sensors and the second exhaust passage may include two oxygen sensors. The two oxygen sensors in the first exhaust passage may supply feedback to control fuel that is injected to the first cylinder bank and the two oxygen sensors in the second exhaust passage may supply feedback to control fuel that is injected to the second cylinder bank. However, if exhaust is transferred from the first cylinder bank to a portion of the second exhaust passage and if exhaust is transferred from the second cylinder bank to a portion of the first exhaust passage to reduce catalyst temperature, air-fuel ratio control may degrade and fuel controller stability may degrade.

The inventors herein have recognized the above-mentioned disadvantages and have developed a fuel control method, comprising: in a first mode, adjusting a first inner-loop target value in response to a first outer-loop correction, and adjusting a second inner-loop target value in response to a second outer-loop correction; in a second mode, adjusting the first inner-loop target value in response to the second outer-loop correction, and adjusting a second inner-loop target value in response to the first outer-loop correction; and supplying fuel to an engine via a controller according to the first inner-loop target value and the second inner-loop target value.

By adjusting inner-loop target based on the first outer-loop correction and the second outer-loop correction, it may be possible to maintain fuel control loop stability and reduce engine emissions even in the presence of switching exhaust flow paths. For example, during low loads and/or during a cold engine start, exhaust from a first cylinder bank may be directed via a short path to a first catalyst. During high engine speeds and engine loads, and after catalysts have been reached light-off, exhaust from the first cylinder bank may be directed via a longer path to a second catalyst. While exhaust from the first cylinder bank is flowing to the first catalyst, fuel flow to the first cylinder bank may be adjusted according to a correction that is generated via a first outer-loop controller that responds to a first downstream oxygen sensor that is positioned downstream of the first catalyst. Conversely, while exhaust from the first cylinder bank is flowing to the second catalyst, fuel flow to the first cylinder bank may be adjusted according to a correction generated via a second outer-loop controller that responds to a second downstream oxygen sensor that is positioned downstream of the second catalyst. This control approach allows fuel that is supplied to a cylinder bank to follow whichever catalyst that is processing exhaust gases from the cylinder bank, thereby adjusting fuel to the cylinder according to the most relevant catalyst state to control emissions of the cylinder bank.

The present description may provide several advantages. In particular, the approach may reduce engine emissions while enabling shorter catalyst light-off times and high load and high speed engine operation. Further, the approach may maintain or increase catalyst efficiency even in the presence of exhaust path switching.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
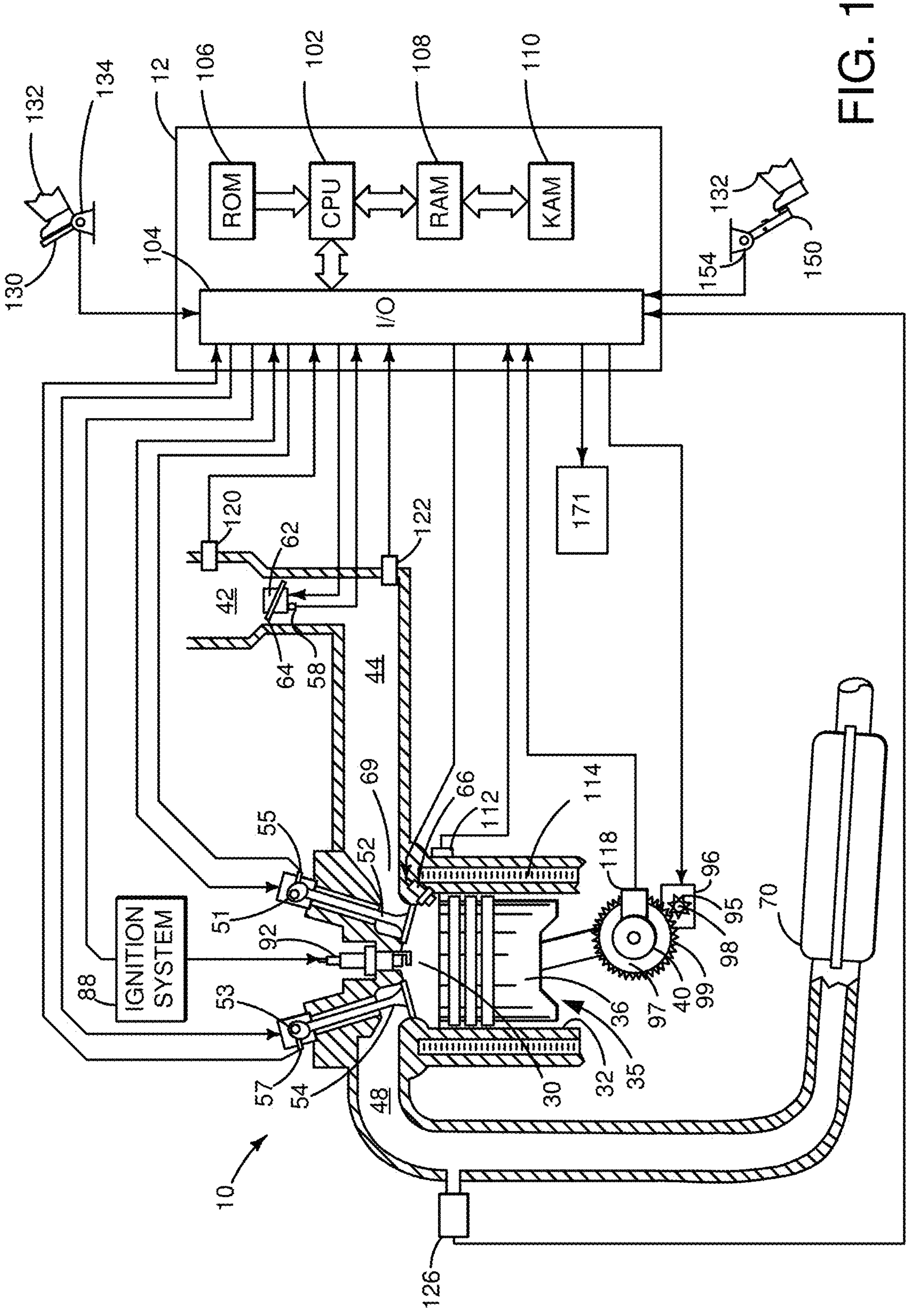
FIG. 1 is a schematic diagram of a single cylinder of an engine.
Figure 6:
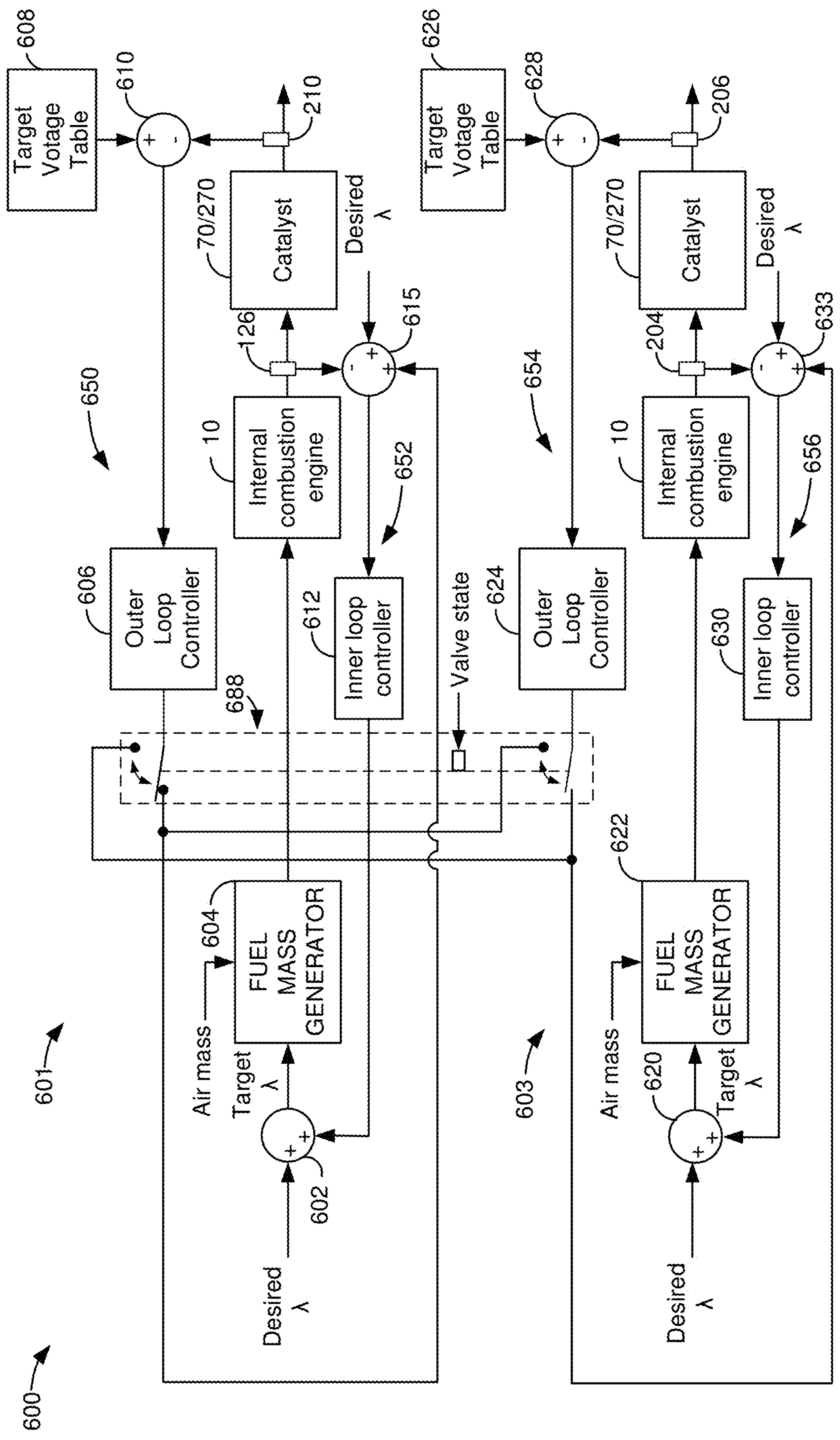
FIG. 6 shows an example first fuel control system that includes an inner fuel control loop and an outer fuel control loop for each cylinder bank.
Figure 7:
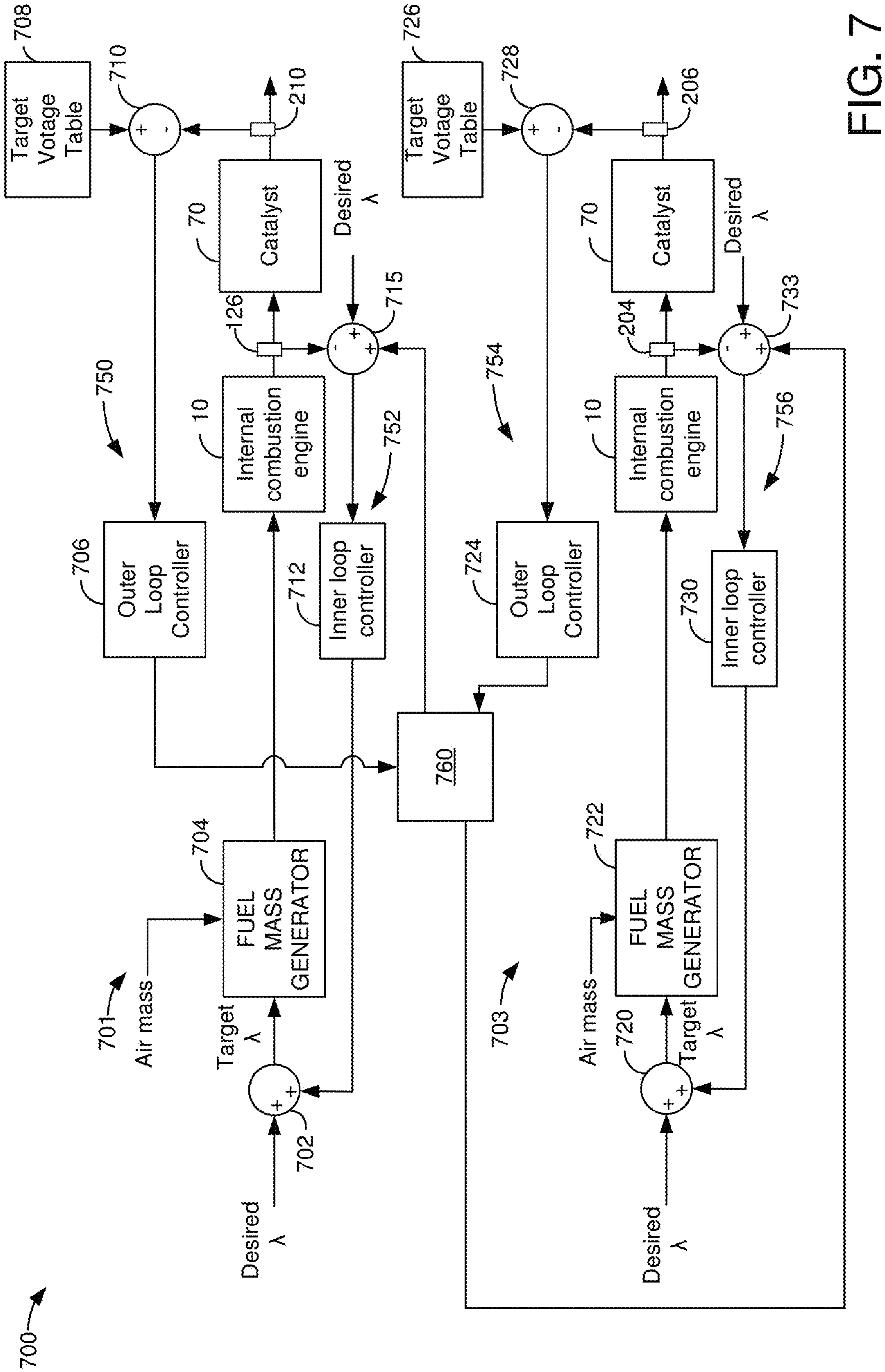
FIG. 7 shows an example second fuel control system that includes an inner fuel control loop and an outer fuel control loop for each cylinder bank.

The present description is related to controlling fuel of an engine that includes two cylinder banks. The cylinder banks are coupled to an exhaust system that includes two valves that allows exhaust flow to change direction so that shortened catalyst light-off and high speed/high load engine operation may be supported. The fuel may be controlled for an internal combustion engine of the type that is shown in FIG. 1. The engine's exhaust system and valves in the exhaust system may be configured with crossover pipes as shown in FIGS. 2-5. The fuel may be controlled via a control system as shown in FIG. 6. Alternatively, the fuel may be controlled via an alternative control system as shown in FIG. 7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 35, which is known to those skilled in the art as direct injection. Fuel injector 66 delivers liquid fuel in proportion to a voltage pulse width or fuel injector pulse width of a signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44.

Distributorless ignition system 88 provides an ignition spark to combustion chamber 30 via spark plug 92 in response to controller 12. First upstream oxygen sensor 126 (e.g., universal Exhaust Gas Oxygen (UEGO) sensor, which may be referred to as a wide-band oxygen sensor) is shown coupled to exhaust manifold 48 upstream of catalytic converter 70. Alternatively, a two-state (e.g., narrow band) exhaust gas oxygen sensor may be substituted for first upstream oxygen sensor 126.

Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a distance displaced by human 132; a position sensor 154 coupled to caliper application pedal 150 for sensing distance displaced by human 132, a measurement of engine manifold pressure (MAP) from pressure sensor 122 coupled to intake manifold 44; an engine position sensor 118 that senses a position of crankshaft 40; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may receive input and communicate conditions such as degradation of components to light, or alternatively, human/machine interface 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
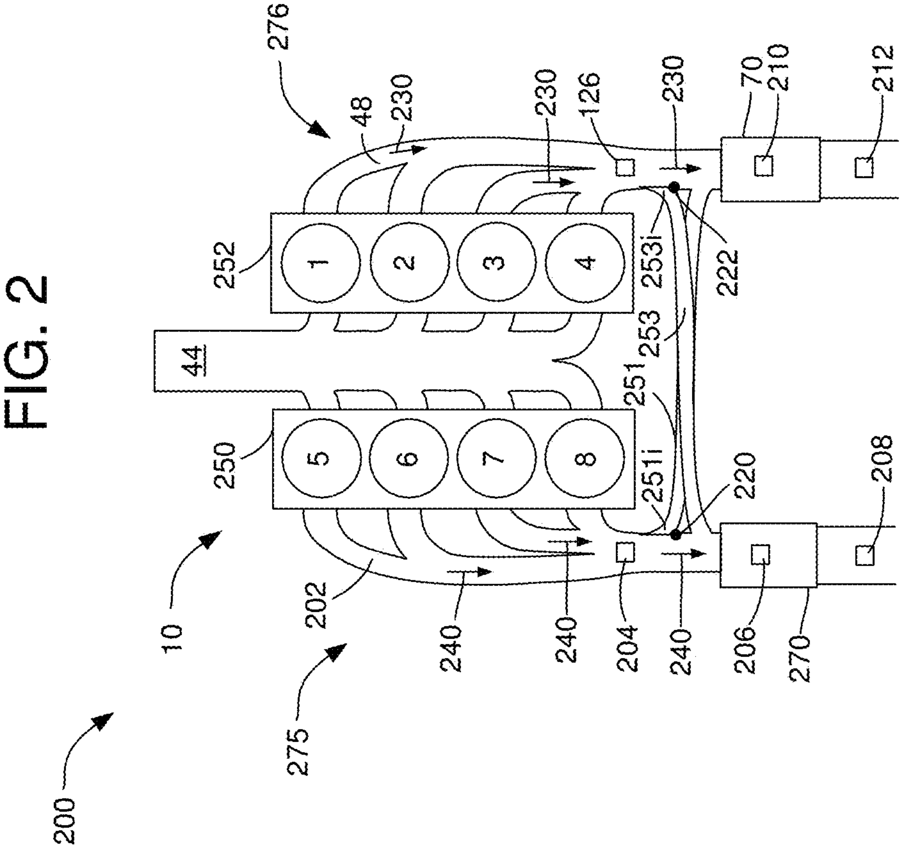
FIG. 2 is a schematic diagram of an eight-cylinder engine with valves arranged in a first configuration in an exhaust system to provide straight exhaust flow through a catalyst.

Referring now to FIG. 2, a plan view 200 of engine 10 is shown. Engine 10 is the same engine as shown in FIG. 1, but in FIG. 2, all engine cylinders are shown. In this example, the engine's cylinders are numbered 1 through 8. The cylinders are supplied with air via intake manifold 44. A right bank of cylinders includes cylinders 1-4 and a left bank of cylinders includes cylinders 5-8. Cylinders 1-4 are shown in fluidic communication with exhaust manifold 48 and cylinders 5-8 are shown in fluidic communication with exhaust manifold 202. Right cylinder bank exhaust system 276 includes exhaust manifold 48 and first upstream oxygen sensor 126. Left cylinder bank exhaust system 275 includes exhaust manifold 202 and second upstream oxygen sensor 204. Each of cylinders 1-8 includes a fuel injector, spark plug, and intake/exhaust valves as shown in FIG. 1.

The engine 10 of FIG. 2 includes catalytic converters 70 and 270 (e.g., close coupled catalysts) that enable fast catalyst light-off when engine 10 is cold started. However, during conditions when the engine is warm and operated at high loads and high speeds for longer periods of time, flowing exhaust gas from left cylinder bank 250 to catalytic converter 270 may cause degradation of catalytic converter 270. In order to reduce a possibility of degrading of catalytic converter 270 during high speed/high load conditions, a position of valve 220 (e.g., left cylinder bank left valve) may be adjusted to direct exhaust to left-to-right crossover pipe 251, which causes exhaust to flow from left cylinder bank 250 to catalytic converter 70. Similarly, in order to reduce a possibility of degrading of catalytic converter 70 during high speed/high load conditions, a position of valve 222 (e.g., a right cylinder bank right valve) may be adjusted to direct exhaust to right-to-left crossover pipe 253, which causes exhaust to flow from right cylinder bank 252 to catalytic converter 270. Left-to-right crossover pipe 251 selectively fluidically couples left cylinder bank exhaust system 275 to right cylinder bank exhaust system 276. Similarly, right-to-left crossover pipe 253 selectively fluidically couples right cylinder bank exhaust system 276 to left cylinder bank exhaust system 275.

In FIG. 2, a first valve configuration where valve 220 is positioned at inlet 251*i* of left-to-right crossover pipe 251 and valve 222 is positioned at inlet 253*i* of right-to-left crossover pipe 253 is shown. Valve 220 is shown in a first position (e.g., a pass through state) where exhaust gas from left cylinder bank 250 bypasses left-to-right crossover pipe 251 and flows a short distance to catalytic converter 270, thereby reducing light-off time of catalytic converter 270 so that engine tailpipe emissions may be reduced. Similarly, valve 222 is shown in a first position where exhaust gas from right cylinder bank bypasses right-to-left crossover pipe 253 and flows a short distance to catalytic converter 70, thereby reducing light-off time of catalytic converter 70 so that engine tailpipe emissions may be reduced. Arrows 240 show a direction of exhaust gas flow from left cylinder bank 250 when valve 220 is blocking exhaust flow from left-to-right crossover pipe 251 as shown. Arrows 230 show a direction of exhaust gas flow from right cylinder bank 252 when valve 222 is blocking exhaust flow from right-to-left crossover pipe 253 as shown.

The first upstream oxygen sensor 126 (e.g., an upstream wide band oxygen sensor (UEGO)) is shown configured to sense exhaust gases from cylinders numbered 1-4 of right cylinder bank 252. The second upstream oxygen sensor 204 (e.g., an upstream wide band oxygen sensor UEGO)) is shown configured to sense exhaust gases from cylinders 5-8 of left cylinder bank 250. A third oxygen sensor 210 (e.g., a downstream narrow band oxygen sensor (HEGO)) is shown configured to sense exhaust gases from within catalytic converter 70, or alternatively, at location 212. A fourth oxygen sensor 206 (e.g., a downstream narrow band oxygen sensor (HEGO)) is shown configured to sense exhaust gases from within catalytic converter 270, or alternatively, at location 208.

Output of first upstream oxygen sensor 126 may be applied as air-fuel or equivalence ratio (e.g., $\lambda$=air-fuel ratio/stoichiometric air-fuel ratio) feedback for controlling fuel that is supplied to cylinders numbered 1-4. Output of second upstream oxygen sensor 204 may be applied as air-fuel or equivalence ratio feedback for controlling fuel that is supplied to cylinders numbered 5-8. Output of third oxygen sensor 210 may be applied as a voltage signal, air-fuel ratio, or equivalence ratio feedback for an outer-loop fuel controller. Output of fourth oxygen sensor 206 (e.g., a downstream oxygen sensor) may be applied as air-fuel or equivalence ratio feedback for an outer-loop controller.

Figure 3:
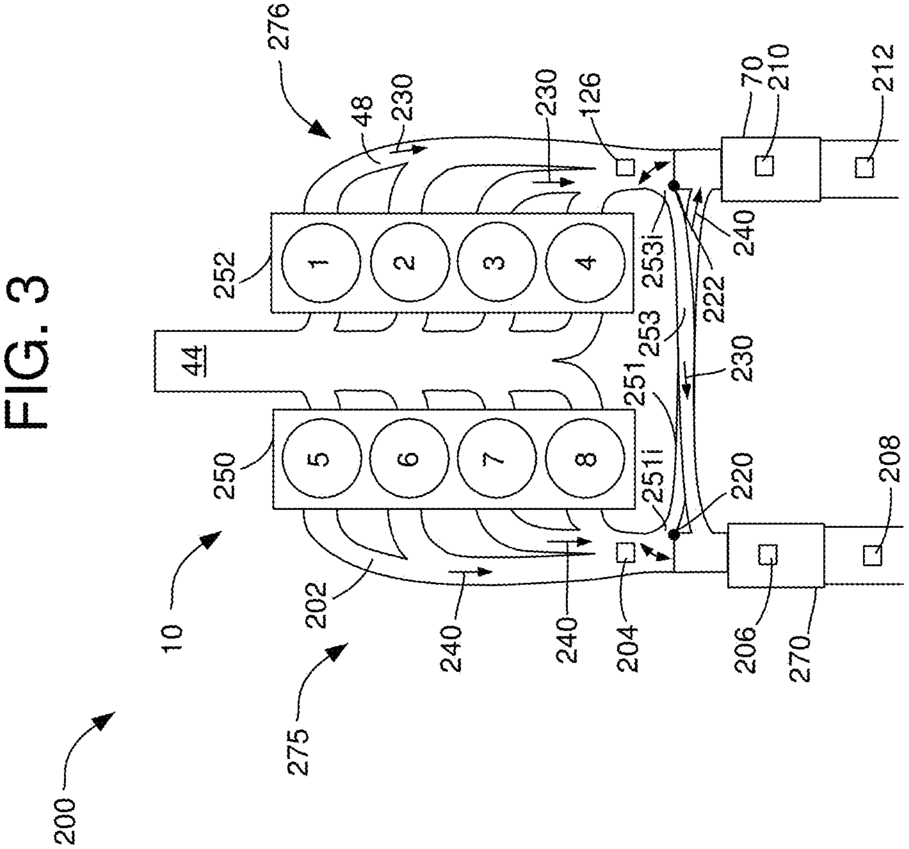
FIG. 3 is a schematic diagram of an eight-cylinder engine with valves arranged in a first configuration in an exhaust system to provide cross-over exhaust flow through a catalyst.

Referring now to FIG. 3, the plan view 200 of engine 10 is shown again. The components of engine 10 are the same as shown in FIG. 2 and the components of engine 10 operate as previously described. Therefore, for the sake of brevity the description of engine 10 and its components is omitted for FIG. 3.

In FIG. 3, valve 220 is positioned at inlet 251*i* of left-to-right crossover pipe 251 and valve 222 is positioned at inlet 253*i* of right-to-left crossover pipe 253. Valve 220 is shown in a second position (e.g., a bypass state) where exhaust gas from left cylinder bank 250 are blocked from entering catalytic converter 270. Instead, exhaust gases from left cylinder bank 250 are directed to left-to-right crossover pipe 251 and the exhaust flows a longer distance to catalytic converter 70, thereby reducing an amount of heat that may be transferred to catalytic converter 70 so that a possibility of catalyst degradation may be reduced. Similarly, valve 222 is shown in a second position where exhaust gas from right cylinder bank 252 are blocked from entering catalytic converter 70. Rather, exhaust gases from right cylinder bank 252 are directed to right-to-left crossover pipe 253 and exhaust flows a longer distance to catalytic converter 270 so that a possibility of catalyst degradation may be reduced. Arrows 240 show a direction of exhaust gas flow from left cylinder bank 250 when valve 220 is blocking exhaust flow from left cylinder bank 250 to catalytic converter 270 as shown. Arrows 230 show a direction of exhaust gas flow from right cylinder bank 252 when valve 222 is blocking exhaust flow from right cylinder bank 252 to catalytic converter 70. Thus, FIG. 3 shows a configuration where exhaust gases from left cylinder bank are processed via catalytic converter 70 and exhaust gases from right cylinder bank are processed via catalytic converter 270.

Figure 4:
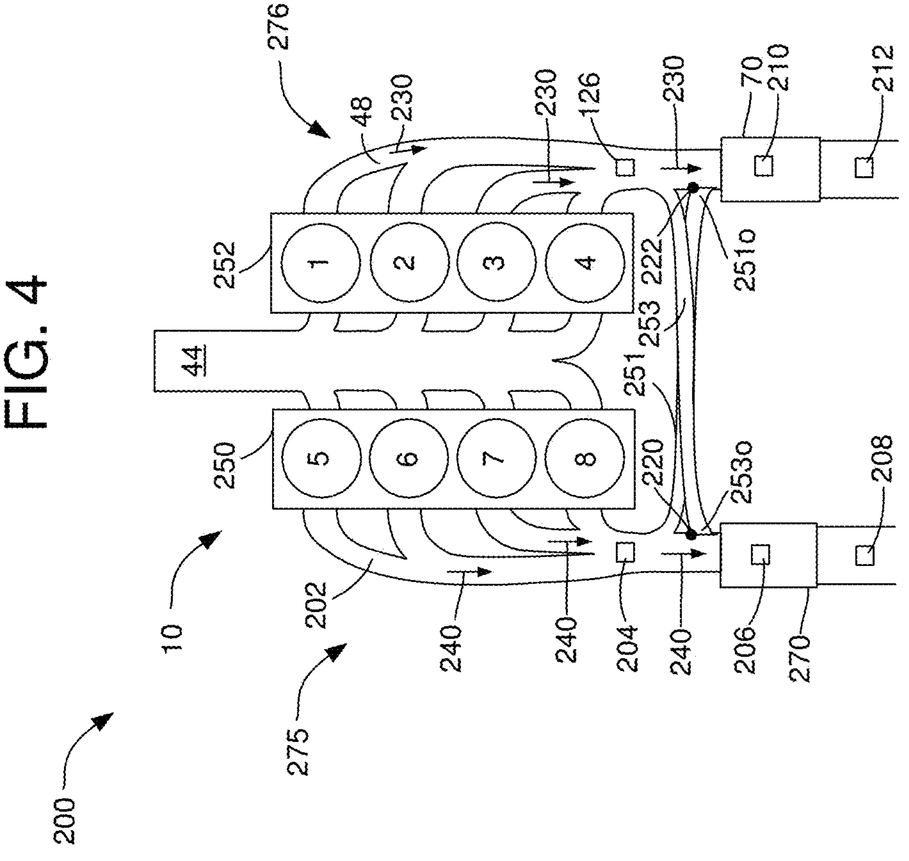
FIG. 4 is a schematic diagram of an eight-cylinder engine with valves arranged in a second configuration in an exhaust system to provide straight exhaust flow through a catalyst.

Referring now to FIG. 4, the plan view 200 of engine 10 is shown again. The components of engine 10 are the same as shown in FIG. 2 and the components of engine 10 operate as previously described. Therefore, for the sake of brevity the description of engine 10 and its components is omitted for FIG. 4.

In FIG. 4, a second valve configuration where valve 220 is positioned at outlet 2530 of right-to-left crossover pipe 253 and valve 222 is positioned at outlet 2510 of left-to-right crossover pipe 251 is shown. Valve 220 is shown in a first position where exhaust gas from right cylinder bank 252 bypasses right-to-left crossover pipe 253 and flows a short distance to catalytic converter 70, thereby reducing light-off time of catalytic converter 70 so that engine tailpipe emissions may be reduced. Similarly, valve 222 is shown in a first position where exhaust gas from left cylinder bank 250 bypasses left-to-right crossover pipe 253 and flows a short distance to catalytic converter 270, thereby reducing light-off time of catalytic converter 270 so that engine tailpipe emissions may be reduced. Arrows 240 show a direction of exhaust gas flow from left cylinder bank 250 when valve 222 is blocking exhaust flow from left-to-right crossover pipe 251 as shown. Arrows 230 show a direction of exhaust gas flow from right cylinder bank 252 when valve 220 is blocking exhaust flow from right-to-left crossover pipe 253 as shown.

Figure 5:
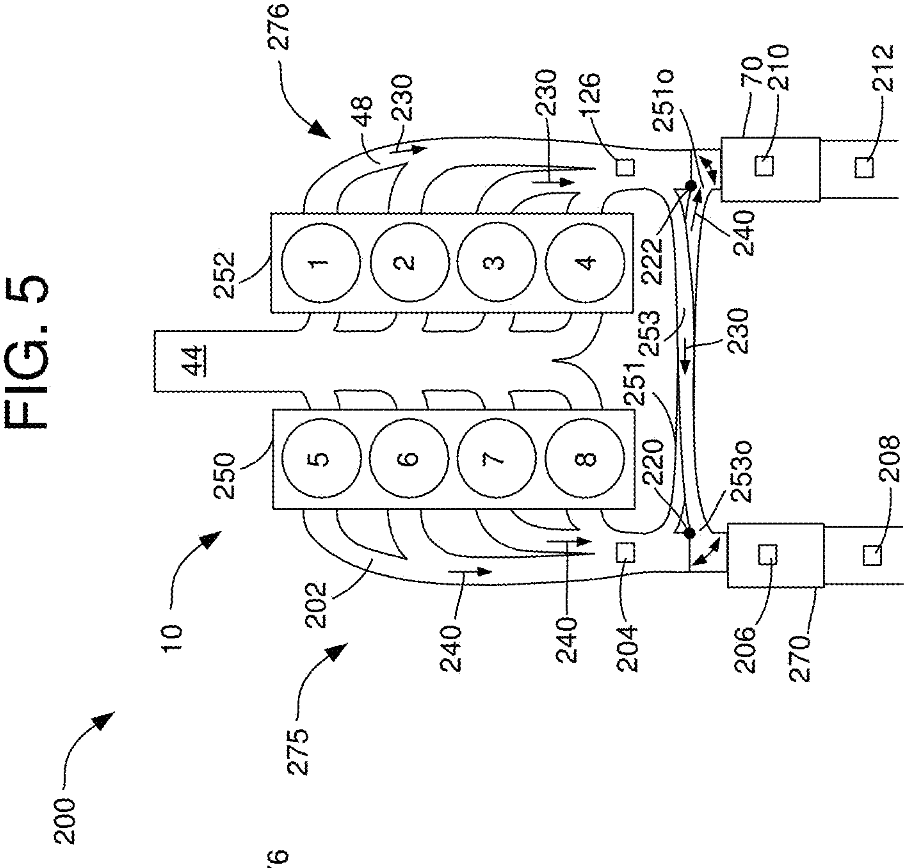
FIG. 5 is a schematic diagram of an eight-cylinder engine with valves arranged in a second configuration in an exhaust system to provide cross-over exhaust flow through a catalyst.

Referring now to FIG. 5, the plan view 200 of engine 10 is shown yet again. The components of engine 10 are the same as shown in FIG. 2 and the components of engine 10 operate as previously described. Therefore, for the sake of brevity the description of engine 10 and its components is omitted for FIG. 5.

In FIG. 5, the second configuration where valve 220 is positioned at outlet 2530 of right-to-left crossover pipe 253 and valve 222 is positioned at outlet 2510 of left-to-right crossover pipe 251 is shown a second time. Valve 220 is shown in a second position where exhaust gas from left cylinder bank 250 is blocked from catalytic converter 270 and it is permitted to flow through left-to-right crossover pipe 251 and catalytic converter 70. Likewise, valve 222 is shown in a second position where exhaust gas from right cylinder bank 252 is blocked from catalytic converter 70 and it is permitted to flow through right-to-left crossover pipe 253 to catalytic converter 270. The second position of these valves allows catalytic converter 70 and catalytic converter 270 to remain cooler even at high engine speeds and loads.

Arrows 240 show a direction of exhaust gas flow from left cylinder bank 250 when valve 220 is blocking exhaust flow from left cylinder bank 250 to catalytic converter 270 as shown. Arrows 230 show a direction of exhaust gas flow from right cylinder bank 252 when valve 222 is blocking exhaust flow from right cylinder bank 252 to catalytic converter 70 as shown.

Thus, the system of FIGS. 1-5 provides for an engine system, comprising: an engine including a left cylinder bank and a right cylinder bank; a right cylinder bank exhaust system coupled to the right cylinder bank; a left cylinder bank exhaust system coupled to the left cylinder bank; a right to left crossover pipe coupling the right cylinder bank exhaust system to the left cylinder bank exhaust system; a left to right crossover pipe coupling the left cylinder bank exhaust system to the right cylinder bank exhaust system; a right valve positioned along the right cylinder bank exhaust system; a left valve positioned along the left cylinder bank exhaust system; a left upstream oxygen sensor; a right upstream oxygen sensor; a left downstream oxygen sensor; a right downstream oxygen sensor; and a controller including executable instructions stored in non-transitory memory that cause the controller to adjust a first inner-loop target value in response to outer-loop corrections generated via two different outer-loop controllers. In a first example, the engine system further comprises additional executable instructions that cause the controller to adjust a second inner-loop target value in response to the outer-loop corrections generated via the two different outer-loop controllers. In a second example that may include the first example, the engine system includes where the first inner-loop target value is adjusted in response to output of a first of the two different outer-loop controllers in response to a first command or a first position of the right valve or the left valve. In a third example that may include one or both of the first and second examples, the engine system includes where the first inner-loop target value is adjusted in response to output of a second of the two different outer-loop controllers in response to a second command or a second position of the right valve or the left valve. In a fourth example that may include one or more of the first through third examples, the engine system includes where the first inner-loop target value is adjusted according to a weighting of the outer-loop corrections generated via the two different outer-loop controllers. In a fifth example that may include one or more of the first through fourth examples, the engine system includes where the weighting is adjusted as a function of time or exhaust flow since the left valve or the right valve moves from a position or is commanded to move from the position. In a sixth example that may include one or more of the first through fifth examples, the engine system further comprises additional executable instructions that cause the controller to adjust an amount of fuel supplied to the right cylinder bank based on the first inner-loop target value.

Referring now to FIG. 6, a block diagram 600 of a first fuel control method and system that includes a right cylinder bank fuel controller 601 and a left cylinder bank fuel controller 603. The right cylinder bank fuel controller 601 controls the amounts of fuel that are supplied to the right bank of engine cylinders and the left cylinder bank fuel controller 603 controls the amounts of fuel that are supplied to the left bank of engine cylinders. This fuel control system allows outer-loop controller corrections to be switched or swapped between the left cylinder bank fuel controller 603 and the right cylinder bank fuel controller 601 so that outer-loop controller corrections change with positions of left cylinder bank left valve 220 and right cylinder bank right valve 222.

It may be appreciated that FIG. 6 shows a simplified version of a fuel control method and system that includes inner and outer loops for left and right cylinder banks. Other versions of fuel control systems having inner and outer control loops for left and right cylinder banks are also anticipated. At least portions of the fuel control method and system that is shown in FIG. 6 may be generated via executable instructions that are stored in non-transitory memory of a controller (e.g., 12 of FIG. 1).

Right cylinder bank fuel controller 601 includes a right cylinder bank inner control loop 652 and a right cylinder bank outer control loop 650. A desired or requested lambda value (e.g., lambda=air-fuel ratio/stoichiometric air-fuel ratio) for the right cylinder bank is input to right cylinder bank summing junction 602 where it is added with a right cylinder bank inner-loop correction lambda value. Right cylinder bank summing junction 602 outputs a target lambda value for the right cylinder bank that is input to block 604 and block 604 generates a fuel mass for the right cylinder bank 252 in response to the target lambda value for the right cylinder bank and a mass air flow rate into the engine. Block 604 outputs a fuel mass that is delivered to the right cylinder bank 252 of internal combustion engine 10. Internal combustion engine 10 combusts the fuel mass with air to generate torque and exhaust. The exhaust from the right cylinder bank is sensed via first upstream oxygen sensor 126 before the exhaust is processed by catalytic converter 70 or catalytic converter 270 depending on positions of valves 220 and 222.

Right cylinder bank outer control loop 650 receives input from downstream oxygen sensor 210 and output from downstream oxygen sensor 210 is subtracted from output of a target voltage table 608 at junction 610. The downstream oxygen sensor voltage error value generated at junction 610 is input to outer-loop controller 606 where a first outer-loop correction value is generated. The first outer-loop correction value may be supplied to either summing junction 615, or alternatively, summing junction 633 via switch 688. In this example, control logic is shown as switch 688 which is configured as a double pole double throw switch whose operating state is controlled via positions of or commands to valves in the exhaust (e.g., valve 220 and 222). If valves 220 and 222 are commanded or positioned to allow exhaust from right cylinder bank 252 to flow to catalytic converter 70, the first outer-loop correction value is input to summing junction 615. If valves 220 and 222 are commanded or positioned to allow exhaust from left cylinder bank 250 to flow to catalytic converter 70, the first outer-loop correction value is input to summing junction 633.

Right cylinder bank inner control loop 652 receives input from first upstream oxygen sensor 126 and it is subtracted from the desired lambda value and the output of the right cylinder bank outer control loop or output of the left cylinder bank outer control loop at summing junction 615. Summing junction 615 output is input to right cylinder bank inner-loop controller 612. Right cylinder bank inner-loop controller 612 outputs an inner-loop correction and that output is input to summing junction 602 where it is added to the desired lambda value.

Left cylinder bank fuel controller 603 includes a left cylinder bank inner control loop 656 and a left cylinder bank outer control loop 654. A desired or requested lambda value (e.g., lambda=air-fuel ratio/stoichiometric air-fuel ratio) for the left cylinder bank is input to left cylinder bank summing junction 620 where it is added with a left cylinder bank inner-loop correction lambda value. Left cylinder bank summing junction 620 outputs a target lambda value for the left cylinder bank that is input to block 622 and block 622 generates a fuel mass for the left cylinder bank 250 in response to the target lambda value for the left cylinder bank and a mass air flow rate into the engine. Block 622 outputs a fuel mass that is delivered to the left cylinder bank 250 of internal combustion engine 10. Internal combustion engine 10 combusts the fuel mass with air to generate torque and exhaust. The exhaust from the left cylinder bank is sensed via second upstream oxygen sensor 204 before the exhaust is processed by catalytic converter 70 or catalytic converter 270 depending on positions of valves 220 and 222.

Left cylinder bank outer control loop 654 receives input from downstream oxygen sensor 206 and output from downstream oxygen sensor 206 is subtracted from output of a target voltage table 626 at junction 628. The downstream oxygen sensor voltage error value generated at junction 628 is input to outer-loop controller 624 where a second outer-loop correction value is generated. The second outer-loop correction value may be supplied to either summing junction 633, or alternatively, summing junction 615 via switch 688. If valves 220 and 222 are commanded or positioned to allow exhaust from left cylinder bank 250 to flow to catalytic converter 270, the second outer-loop correction value is input to summing junction 633. If valves 220 and 222 are commanded or positioned to allow exhaust from right cylinder bank 252 to flow to catalytic converter 270, the second outer-loop correction value is input to summing junction 615.

Left cylinder bank inner control loop 656 receives input from second upstream oxygen sensor 204 and it is subtracted from the desired lambda value and the output of the left cylinder bank outer control loop or output of the right cylinder bank outer control loop at summing junction 633. Summing junction 633 output is input to left cylinder bank inner-loop controller 630. Left cylinder bank inner-loop controller 630 outputs an inner-loop correction and that output is input to summing junction 620 where it is added to the desired lambda value.

Thus, as shown and discussed with regard to FIG. 6, outer-loop corrections ($\Delta\lambda_{c,OL}$, e.g., output of block 606) may be applied as a modification of an inner-loop target $\lambda$ ($\lambda_{t,IL}$, e.g., input to block 612) such that: $\lambda_{t,IL}=\lambda_{des}+\Delta\lambda_{c,OL}$, where $\lambda_{des}$ is the desired lambda value. As valves and the exhaust system switch back and forth from direct or straight flow (e.g., a direct exhaust path that does not include flowing through a crossover pipe) to crossover exhaust flow (e.g., exhaust flows from a cylinder bank through a crossover pipe) the outer-loop corrections may be assigned to correct targets of different inner-loops according to the following equations:

For direct exhaust flow paths:

$$\lambda_{t,IL}[R] = \lambda_{des} + \Delta\lambda_{c,OL}[R]$$

$$\lambda_{t,IL}[L] = \lambda_{des} + \Delta\lambda_{c,OL}[L]$$

For crossover exhaust flow paths:

$$\lambda_{t,IL}[R] = \lambda_{des} + \Delta\lambda_{c,OL}[L]$$

$$\lambda_{t,IL}[L] = \lambda_{des} + \Delta\lambda_{c,OL}[R]$$

where [R] identifies the right cylinder bank, [L] identifies the left cylinder bank, $\Delta\lambda_{c,OL}$ corresponds to the lambda correction for an outer-loop, $\lambda_{des}$ is desired lambda, $\lambda_{t,IL}$ is target lambda for the inner-loop controller. During a time when valves in the exhaust are moving, outer loop corrections may be held at their most recent value.

It may be appreciated that instead of switching the output of right outer loop controller 606 from summing junction 615 to summing junction 633 and switching the output of left outer loop controller 624 from summing junction 633 to summing junction 615, output of right downstream oxygen sensor 210 may be switched from summing junction 610 to summing junction 628 and output of left downstream oxygen sensor 206 may be switched from summing junction 628 to summing junction 610 in response to changing the position of valves 220 and 222 to perform substantially a same function and achieve a substantially same result as switching the destination of outputs of the outer loop controllers 606 and 624. Additionally, output of target voltage table 626 may be switched to summing junction 610 and output of target voltage table 608 may be switched to summing junction 628.

Moving on to FIG. 7, block diagram of an alternative fuel control method and system for an engine with two cylinder banks is shown. Instead of switching outer-loop corrections to adjust inner-loop target values as performed by the controller of FIG. 6, FIG. 7 shows a method whereby outer-loop corrections may be gradually shifted. Block diagram 700 of a second fuel control system includes a right cylinder bank fuel controller 701 and a left cylinder bank fuel controller 703. The right cylinder bank fuel controller 701 controls the amounts of fuel that are supplied to the right bank of engine cylinders and the left cylinder bank fuel controller 703 controls the amounts of fuel that are supplied to the left bank of engine cylinders. This fuel control system allows outer-loop controller corrections to be gradually changed between the left cylinder bank fuel controller 703 and the right cylinder bank fuel controller 701 so that outer-loop controller corrections gradually change with positions of left cylinder bank left valve 220 and right cylinder bank right valve 222.

It may be appreciated that FIG. 7 shows a simplified version of a fuel control method and system that includes inner and outer loops for left and right cylinder banks. Other versions of fuel control methods and systems having inner and outer control loops for left and right cylinder banks are also anticipated. At least portions of the fuel control method and system that is shown in FIG. 7 may be generated via executable instructions that are stored in non-transitory memory of a controller (e.g., 12 of FIG. 1).

Right cylinder bank fuel controller 701 includes a right cylinder bank inner control loop 752 and a right cylinder bank outer control loop 750. A desired or requested lambda value (e.g., lambda=air-fuel ratio/stoichiometric air-fuel ratio) for the right cylinder bank is input to right cylinder bank summing junction 702 where it is added with a right cylinder bank inner-loop correction lambda value. Right cylinder bank summing junction 702 outputs a target lambda value for the right cylinder bank that is input to block 704 and block 704 generates a fuel mass for the right cylinder bank 252 in response to the target lambda value for the right cylinder bank and a mass air flow rate into the engine. Block 704 outputs a fuel mass that is delivered to the right cylinder bank 252 of internal combustion engine 10. Internal combustion engine 10 combusts the fuel mass with air to generate torque and exhaust. The exhaust from the right cylinder bank is sensed via first upstream oxygen sensor 126 before the exhaust is processed by catalytic converter 70 or catalytic converter 270 depending on positions of valves 220 and 222.

Right cylinder bank outer control loop 750 receives input from downstream oxygen sensor 210 and output from downstream oxygen sensor 210 is subtracted from output of a target voltage table 708 at junction 710. The downstream oxygen sensor voltage error value generated at junction 710 is input to outer-loop controller 706 where a first outer-loop correction value is generated. The first outer-loop correction value is supplied to block 760 where a weighting function blends the first outer-loop correction value with a second outer-loop correction to generate a weighted correction that is delivered to summing junction 715. The weighting value (w) may be adjusted as a function of time since a most recent movement or command of a valve (e.g., valves 220 and 222), and/or exhaust flow rate, and/or valve position (e.g., positions of valves 220 and 222). The weighting value may vary between 0 and 1 as a function of time, exhaust flow rate, or valve position.

Right cylinder bank inner control loop 752 receives input from first upstream oxygen sensor 126 and it is subtracted from the desired lambda value and the output of block 760 (e.g., weighted outer control loop correction for right cylinder bank inner loop) at summing junction 715. Summing junction 715 output is input to right cylinder bank inner-loop controller 712. Right cylinder bank inner-loop controller 712 outputs an inner-loop correction and that output is input to summing junction 702 where it is added to the desired lambda value.

Left cylinder bank fuel controller 703 includes a left cylinder bank inner control loop 756 and a left cylinder bank outer control loop 754. A desired or requested lambda value for the left cylinder bank is input to left cylinder bank summing junction 720 where it is added with a left cylinder bank inner-loop correction lambda value. Left cylinder bank summing junction 720 outputs a target lambda value for the left cylinder bank that is input to block 722 and block 722 generates a fuel mass for the left cylinder bank 250 in response to the target lambda value for the left cylinder bank and a mass air flow rate into the engine. Block 722 outputs a fuel mass that is delivered to the left cylinder bank 250 of internal combustion engine 10. Internal combustion engine 10 combusts the fuel mass with air to generate torque and exhaust. The exhaust from the left cylinder bank is sensed via second upstream oxygen sensor 204 before the exhaust is processed by catalytic converter 70 or catalytic converter 270 depending on positions of valves 220 and 222.

Left cylinder bank outer control loop 754 receives input from downstream oxygen sensor 206 and output from downstream oxygen sensor 206 is subtracted from output of a target voltage table 726 at junction 728. The downstream oxygen sensor voltage error value generated at junction 728 is input to outer-loop controller 724 where a second outer-loop correction value is generated. The second outer-loop correction value is supplied to block 760 where a weighting function blends the second outer-loop correction value with the first outer-loop correction to generate a weighted correction that is delivered to summing junction 733. The weighting value (w) may be adjusted as a function of time since a most recent movement or command of a valve (e.g., valves 220 and 222), and/or exhaust flow rate, and/or valve position (e.g., positions of valves 220 and 222). The weighting value may vary between 0 and 1 as a function of time, exhaust flow rate, or valve position.

Left cylinder bank inner control loop 756 receives input from second upstream oxygen sensor 204 and it is subtracted from the desired lambda value and the output of the weighted left cylinder bank outer control loop correction value at summing junction 733. Summing junction 733 output is input to left cylinder bank inner-loop controller 730. Left cylinder bank inner-loop controller 730 outputs an inner-loop correction and that output is input to summing junction 720 where it is added to the desired lambda value.

Thus, as shown and discussed with regard to FIG. 7, a weighted average of right and left cylinder bank outer-loop corrections may be applied to right and left cylinder bank inner-loop targets according to the following equations:

$$\lambda_{t,IL}[R] = \lambda_{des} + w \times \Delta\lambda_{c,OL}[R] + (1-w) \times \Delta\lambda_{c,OL}[L]$$

$$\lambda_{t,IL}[L] = \lambda_{des} + w \times \Delta\lambda_{c,OL}[L] + (1-w) \times \Delta\lambda_{c,OL}[R]$$

where [R] identifies the right cylinder bank, [L] identifies the left cylinder bank, $\Delta\lambda_{c,OL}$ corresponds to the lambda correction for an outer-loop, $\lambda_{des}$ is desired lambda, $\lambda_{t,IL}$ is target lambda for the inner-loop controller.

For direct exhaust flow paths:

$$\lambda_{t,IL}[R] = \lambda_{des} + 1 \times \Delta\lambda_{c,OL}[R] + 0 \times \Delta\lambda_{c,OL}[L]$$

$$\lambda_{t,IL}[L] = \lambda_{des} + 1 \times \Delta\lambda_{c,OL}[L] + 0 \times \Delta\lambda_{c,OL}[R]$$

For crossover exhaust flow paths:

$$\lambda_{t,IL}[R] = \lambda_{des} + 0 \times \Delta\lambda_{c,OL}[R] + 1 \times \Delta\lambda_{c,OL}[L]$$

$$\lambda_{t,IL}[L] = \lambda_{des} + 0 \times \Delta\lambda_{c,OL}[L] + 1 \times \Delta\lambda_{c,OL}[R]$$

During a time when valves in the exhaust are moving, the value of the weighting factor (w) may be adjusted as a function of one or more of valve position (e.g., valve 222 or 22), exhaust flow, and/or most recent time since valve movement was commanded to change.

The methods of FIGS. 6 and 7 provides for a fuel control method, comprising: in a first mode, adjusting a first inner-loop target value in response to a first outer-loop correction, and adjusting a second inner-loop target value in response to a second outer-loop correction; in a second mode, adjusting the first inner-loop target value in response to the second outer-loop correction, and adjusting a second inner-loop target value in response to the first outer-loop correction; and supplying fuel to an engine via a controller according to the first inner-loop target value and the second inner-loop target value. In a first example, the fuel control method includes where the engine includes a first upstream oxygen sensor, a second upstream oxygen sensor, a first downstream oxygen sensor, and a second downstream oxygen sensor. In a second example that may include the first example, the fuel control method includes where the first outer-loop correction is based on output of the first downstream oxygen sensor, and where the second outer-loop correction is based on output of the second downstream oxygen sensor. In a third example that may include one or both of the first and second examples, the fuel control method includes where fuel supplied to a right cylinder bank is based on the first inner-loop target value, and where fuel supplied to a left cylinder bank is based on the second inner-loop target value. In a fourth example that may include one or more of the first through third examples, the fuel control method further comprises a first inner-loop controller and a second inner-loop controller. In a fifth example that may include one or more of the first through fourth examples, the fuel control method includes where the first inner-loop controller receives input from the first upstream oxygen sensor, and where the second inner-loop controller receives input from the second upstream oxygen sensor. In a sixth example that may include one or more of the first through fifth examples, the fuel control method includes where the first mode is activated based on a valve in an exhaust passage of the engine being in a first position or being commanded to the first position. In a seventh example that may include one or more of the first through sixth examples, the fuel control method includes where the second mode is activated based on the valve in an exhaust passage of the engine being in a second position or being commanded to the second position.

The methods of FIGS. 6 and 7 provides for a fuel control method, comprising: adjusting an amount of fuel supplied to a cylinder bank of an internal combustion engine in response to a first outer-loop controller output and a second outer-loop controller output. In a first example, the fuel control method includes where the first outer-loop controller output is blended with the second outer-loop controller output, and where a weighting factor adjusts blending between the first outer-loop controller output and the second outer-loop controller output. In a second example that may include the first example, the fuel control method includes where the amount of fuel supplied to the cylinder bank is adjusted via switching between the first outer-loop controller output and the second outer-loop controller output. In a third example that may include one or both of the first and second examples, the fuel control method further comprises adjusting the amount of fuel supplied to the cylinder bank in further response to a position or command of a valve in an exhaust system of the internal combustion engine. In a fourth example that may include one or more of the first through third examples, the fuel control method further comprises adjusting the position or command in response to a temperature or an exhaust flow rate.

Note that the example control and estimation routines included herein can be used with various engine and/or vehicle system configurations. In addition, although the methods included herein refer to lambda control, the approaches herein may be applied with other units. For example, the approaches herein describe lambda control, but in other examples, the controls and methods may be configured for air-fuel ratio control. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, V6, V8, V10, and V12 engines operating in natural gas, gasoline, diesel, or alternative fuel configurations could use the present description to advantage.

The invention claimed is:

1. A fuel control method, comprising:

in a first mode, adjusting a first inner-loop target value in response to a first outer-loop correction, and adjusting a second inner-loop target value in response to a second outer-loop correction;

in a second mode, adjusting the first inner-loop target value in response to the second outer-loop correction, and adjusting the second inner-loop target value in response to the first outer-loop correction; and supplying fuel to an engine via a controller according to the first inner-loop target value and the second inner-loop target value, wherein switching between the first mode and the second mode is based on a change in an exhaust flow route from a direct exhaust flow path to a crossover exhaust flow path.

2. The fuel control method of claim 1, where the engine includes a first upstream oxygen sensor, a second upstream oxygen sensor, a first downstream oxygen sensor, and a second downstream oxygen sensor.

3. The fuel control method of claim 2, where the first outer-loop correction is based on output of the first downstream oxygen sensor, and where the second outer-loop correction is based on output of the second downstream oxygen sensor.

4. The fuel control method of claim 3, where fuel supplied to a right cylinder bank is based on the first inner-loop target value, and where fuel supplied to a left cylinder bank is based on the second inner-loop target value.

5. The fuel control method of claim 4, further comprising a first inner-loop controller and a second inner-loop controller, wherein the first inner-loop controller controls fuel supply to the right cylinder bank, and the second inner-loop controller controls fuel supply to the left cylinder bank.

6. The fuel control method of claim 5, where the first inner-loop controller receives input from the first upstream oxygen sensor, and where the second inner-loop controller receives input from the second upstream oxygen sensor.

7. The fuel control method of claim 1, where the first mode is activated based on a valve in an exhaust passage of the engine being in a first position or being commanded to the first position, the first position corresponding to the direct exhaust flow path where exhaust from a right cylinder bank flows in a straight exhaust flow through a first catalyst and exhaust from a left cylinder bank flows in a straight exhaust flow through a second catalyst.

8. The fuel control method of claim 7, where the second mode is activated based on the valve in the exhaust passage of the engine being in a second position or being commanded to the second position, the second position corresponding to the crossover exhaust flow path where exhaust from the right cylinder bank flows through a first crossover pipe to the second catalyst and exhaust from the left cylinder bank flows through a second crossover pipe to the first catalyst.

9. An engine system, comprising:

an engine including a left cylinder bank and a right cylinder bank;

a right cylinder bank exhaust system coupled to the right cylinder bank;

a left cylinder bank exhaust system coupled to the left cylinder bank;

a right to left crossover pipe coupling the right cylinder bank exhaust system to the left cylinder bank exhaust system;

a left to right crossover pipe coupling the left cylinder bank exhaust system to the right cylinder bank exhaust system;

a right valve positioned along the right cylinder bank exhaust system;

a left valve positioned along the left cylinder bank exhaust system;

a left upstream oxygen sensor;

a right upstream oxygen sensor;

a left downstream oxygen sensor;

a right downstream oxygen sensor; and a controller including executable instructions stored in non-transitory memory that cause the controller to adjust a first inner-loop target value in response to outer-loop corrections generated via two different outer-loop controllers.

10. The engine system of claim 9, further comprising additional executable instructions that cause the controller to adjust a second inner-loop target value in response to the outer-loop corrections generated via the two different outer-loop controllers.

11. The engine system of claim 10, where the first inner-loop target value is adjusted in response to output of a first of the two different outer-loop controllers in response to a first command or a first position of the right valve or the left valve.

12. The engine system of claim 11, where the first inner-loop target value is adjusted in response to output of a second of the two different outer-loop controllers in response to a second command or a second position of the right valve or the left valve.

13. The engine system of claim 9, where the first inner-loop target value is adjusted according to a weighting of the outer-loop corrections generated via the two different outer-loop controllers.

14. The engine system of claim 13, where the weighting is adjusted as a function of time or exhaust flow since the left valve or the right valve moves from a position or is commanded to move from the position.

15. The engine system of claim 9, further comprising additional executable instructions that cause the controller to adjust an amount of fuel supplied to the right cylinder bank based on the first inner-loop target value.

16. A fuel control method, comprising:

adjusting an amount of fuel supplied to a cylinder bank of an internal combustion engine in response to a first outer-loop controller output from a first outer-loop controller and a second outer-loop controller output from a second outer-loop controller, wherein the first outer-loop controller output is based on a first downstream oxygen sensor positioned downstream of a first catalyst, wherein the second outer-loop controller output is based on a second downstream oxygen sensor positioned downstream of a second catalyst, wherein exhaust from the cylinder bank is routed to the first catalyst during a first set of conditions and the exhaust from the cylinder bank is routed to the second catalyst during a second set of different conditions.

17. The fuel control method of claim 16, where the first outer-loop controller output is blended with the second outer-loop controller output, and where a weighting factor adjusts blending between the first outer-loop controller output and the second outer-loop controller output.

18. The fuel control method of claim 16, where the amount of fuel supplied to the cylinder bank is adjusted via switching between the first outer-loop controller output and the second outer-loop controller output.

19. The fuel control method of claim 16, further comprising adjusting the amount of fuel supplied to the cylinder bank in further response to a position or command of a valve in an exhaust system of the internal combustion engine.

20. The fuel control method of claim 19, further comprising adjusting the position or command in response to a temperature or an exhaust flow rate.

* * * * *